(12) United States Patent
Tamsilian et al.

(10) Patent No.: US 10,414,970 B2
(45) Date of Patent: Sep. 17, 2019

(54) SMART POLYMER FLOODING PROCESS

(71) Applicants: Yousef Tamsilian, Tehran (IR); Ahmad Ramazani Saadatabadi, Tehran (IR)

(72) Inventors: Yousef Tamsilian, Tehran (IR); Ahmad Ramazani Saadatabadi, Tehran (IR)

(*) Notice: Subject to any disclaimer, the term of this patent is extended or adjusted under 35 U.S.C. 154(b) by 242 days.

(21) Appl. No.: 14/493,349

(22) Filed: Sep. 23, 2014

(65) Prior Publication Data
US 2015/0148269 A1    May 28, 2015

Related U.S. Application Data

(60) Provisional application No. 61/880,989, filed on Sep. 23, 2013.

(51) Int. Cl.
*C09K 8/584* (2006.01)
*C09K 8/588* (2006.01)

(52) U.S. Cl.
CPC .............. *C09K 8/584* (2013.01); *C09K 8/588* (2013.01); *C09K 2208/10* (2013.01)

(58) Field of Classification Search
None
See application file for complete search history.

(56) References Cited

U.S. PATENT DOCUMENTS

| 3,704,750 | A | * | 12/1972 | Miles | C02F 5/105 166/279 |
|---|---|---|---|---|---|
| 6,380,136 | B1 | * | 4/2002 | Bates | C09K 8/536 507/219 |
| 6,764,980 | B2 | * | 7/2004 | Bates | C09K 8/536 507/219 |
| 8,359,750 | B2 | | 1/2013 | Tran | |
| 9,023,966 | B2 | | 5/2015 | Zhang | |
| 2008/0038176 | A1 | * | 2/2008 | Duguet | B01F 17/0071 423/328.1 |
| 2010/0004146 | A1 | * | 1/2010 | Panga | C04B 28/02 507/212 |
| 2010/0303874 | A1 | * | 12/2010 | Akcora | B82Y 30/00 424/401 |
| 2017/0015893 | A1 | | 1/2017 | Al-Yousef et al. | |

FOREIGN PATENT DOCUMENTS

CN    104531118 A    4/2015

* cited by examiner

*Primary Examiner* — Jeffrey D Washville
(74) *Attorney, Agent, or Firm* — Bajwa IP Law Firm; Haris Zaheer Bajwa

(57) ABSTRACT

Design and preparation of a smart system, including a hydrophilic polymer nanoparticle as a core material and a hydrophilic-hydrophobic block copolymer as a coating nanolayer for use in a smart core-shell nanostructure flooding during enhanced oil recovery (EOR) process. The hydrophilic polymers are prepared by an inverse emulsion method. The central core of this nanostructure includes hydrophilic polymer. The nanolayer can be a surfmer. The binary properties of the shell and hydrophilic polymers increase the water viscosity in the water-oil interface and enhance oil recovery.

19 Claims, 4 Drawing Sheets

SMART POLYMER FLOODING PROCESS

CROSS REFERENCE TO RELATED APPLICATION

The present invention claims priority from U.S. Provisional Patent Application Ser. No. 61/880,989, filed Sep. 23, 2013, entitled "SMART POLYMER FLOODING PROCESS," the subject matter of which is incorporated by reference herein in its entirety.

SPONSORSHIP STATEMENT

This application has been sponsored by the Iranian Nanotechnology Initiative Council, which does not have any rights in this application.

TECHNICAL FIELD

The present invention relates to the design and preparation of a targeting delivery system for polymer flooding processes based on hydrophilic polymer nanoparticles coated by a hydrophilic-hydrophobic nanolayer.

BACKGROUND OF THE INVENTION

In the context of oil extraction, many oil reservoirs are fractured and much oil remains trapped therein after classical enhanced oil recovery processes, such as water flooding, gas injection or in-situ combustion, have finished. The high remaining oil saturation could be due to a poor sweep in these reservoirs by these conventional primary extraction approaches. Polymer flooding processes using natural polymers, such as xanthan and starch, synthetic polymers, such as polyacrylamide (PAM) and partially hydrolyzed polyacrylamide (HPAM), can significantly increase the oil recovery percentage, as compared to the aforesaid conventional water flooding process, in a significant number of these unspent reservoirs. A treatment by polymer flooding has various benefits, including increasing the viscosity of injected water, which increases sweep efficiency due to the improved mobility ratio, and reducing the total volume of water required to reach the residual oil saturation.

As mentioned hereinabove, PAM and HPAM are the most widely used polymers to control the mobility ratio of water to oil in the so-called secondary and tertiary oil recovery processes and methodologies. As mentioned, these polymers increase the water viscosity, hindering water fingering phenomena and pushing the oil forward or to the front for retrieval, as a result from the extremely high molecular weight of the polymers, and the repulsion between the negative charges along the polymer chain, is based on maximum chain extension. However, there are many limitations with traditional polymer flooding technologies, such as thermal, mechanical, salinity, shear and biological degradations of polymer chains during the flooding process.

The aforementioned chain extension approach leads to one of the greatest disadvantages of using PAM and HPAM in oil reservoirs. For example, when polyvalent salts are used in oilfield brine solutions, negative charges are extended from each other along the polymer chain by interaction with cations in the solution. The polymer chains, no longer extend fully, cause the solution to have decreased viscosity due to the ion-dipole interaction between the salt cations and the oxygen atoms in polyacrylamide molecules. The strong ion-dipole interaction between the divalent cations, $Ca^{2+}$ and $Mg^{2+}$ and the amide group because of higher charge densities than $Na^+$, weakens the bond strengths of NaH and C=O bonds. This phenomena leads to the chemical degradation of polymer molecules and decreases the polymer solution viscosity.

In addition, shearing and heating in wellbores and reservoirs often decrease the polymer viscosity. Polymer solutions, as any non-Newtonian fluid, conform to the power law, including viscosity, shear rate, consistency index, and flow behavior index. The polymer solution viscosity is thus easily calculated under any shear rate based on the determined consistency and flow behavior indexes as with any fluid. As is understood in the art, the consistency index increases with increasing polymer concentration, but decreases with increasing temperature. On the other hand, the flow behavior index decreases with increasing polymer concentration, and slightly increases at high temperature. Therefore, it should be understood that a higher HPAM concentration leads to higher viscosities, and polymer viscosity is reduced at a higher shear rate and temperature.

Mechanical degradation of acrylamide-based polymers, as a result of flow through pumps, chokes and valves, as well as action at the sand face, have been recently reported as a disadvantage in oil reservoir applications, where the rheology properties and mechanical degradation were measured by mobility reduction, and the loss in viscosity of the solution effluent, respectively. In the particular range of shear rates, the polymer solution generally shows thickening and thinning behaviors with shear rate increasing. Thus, the thickening behavior is found to be due to the coil-stretch transition at the entry point, and the flow in the bulk of the capillaries is found purely thinning in the whole shear rate ranges. Regarding the effect of shear in the bulk of the capillaries, the degradation starts to increase above a critical shear rate, for example, 15000 $s^{-1}$, and the entry point degradation sharply increases polymer degradation at high shear rates, for example, 850,000 $s^{-1}$.

It should, therefore, be understood that these results show at least three points: 1) that high shear equipment, such as pumps, chokes and valves, can have a detrimental influence on the mechanical strength of the polymer chains, and hence should be utilized with caution, 2) more mechanically-stable polymers can be utilized, and 3) the polymer entanglement at the sand face, and the flow of polymer through perforations and throats, can further degrade the polymer, leading to mobility reduction.

Water soluble polymers, such as polyacrylamide, partially hydrolyzed polyacrylamide, and thermoviscosifying polymer with polyacrylamide main chains, have been widely used in enhanced oil recovery (EOR) approaches to increase the viscosity of injected water, which increases sweep efficiency due to the aforesaid improved mobility ratio. The main problem of using these materials is related to the increase of the water viscosity in undesired directions, such as before reaching the remaining secondary and tertiary oil areas. Additionally, mechanical, thermal and bacterial damages, as well as surface absorption, of these polymers indicate additional limitations of these traditional polymer flooding techniques.

Much effort has been expended to overcome the above-mentioned limitations in polymer flooding with polyacrylamide solutions, such as the copolymerization of acrylamide, with more resistant monomers, such as thermoviscosifying polymers (TVPs). TVP viscosity increases with increasing temperature and salinity due to the association temperature ($T_{ass}$), which may overcome the aforementioned disadvantages of most water soluble polymers against high temperature and salinity conditions. However, heavy biological and mechanical environments can dissociate these structures because of the above mentioned effects.

Recently, smart coating has been considered as a more sophisticated approach for protection and controlled release of precious materials in many applications, particularly with the increase in manufacturing nano-sized particles and structures. For example, in analyzing a drug delivery study as a smart system, where transporting a pharmaceutical compound through the body as needed to safely achieve its desired therapeutic effect at a particular loci, this technology model has been adapted for use in reservoirs, and is one of the advanced technology paradigms adopted in this case. In these advanced systems, a considered pharmaceutical compound, e.g., as a hydrophobic material (core material), is capsulated or coated (chemically graft) with one or two hydrophilic polymers via solution, radiation induced, suspension, and emulsion polymerizations, which have responses to a determined or predetermined stimuli, encapsulating the core material in nanolayers.

It should be understood that encapsulation (e.g., the physical coating of a particle with another material) of hydrophilic polymers by hydrophobic polymer nanolayers is useful technique to protect the active materials, a general description for which is set forth in a related case, U.S. patent application Ser. No. 13/730,938, with a common inventor to the instant case.

Accordingly, a polymeric shell acts as a protective layer for a water soluble polymer, preventing rapid degradation and mechanical shear stresses, both in surface facilities and near the wellbore. Therefore, when the core-shell nanostructures reach the oil-water interface, the hydrophobic polymeric outer shell or nanolayers dissolves in the oil phase, and the hydrophilic core polymer, after passage and penetration through the hydrophobic wall, is able to propagate in the whole water phase, leading to beneficial increases in water viscosity. However, in the aforesaid encapsulation technique, although the active materials are protected and the less hydrophilic outer polymer coating or nanolayers are considerably consumed during an enhanced oil recovery (EOR) process, the polymer propagation in the water phase, after the hydrophobic nanolayer penetration in the oil phase, can nonetheless fail to thicken at the frontier with high viscosity water because of nanoparticle dispersion in the whole water phase.

Thus, there is a present need for an improved technique and composition to overcome this obstacle. Here, the external hydrophobic polymer block of the block copolymer shell penetrates in the oil phase and the internal hydrophilic polymer block with the core part remains in the water phase. Thus, in operation, there is a need for an improved composition and structure that results in the thickening or increasing of the viscosity of the downstream water phase, which pushes the oil to the production wells.

On the other hand, there is also a need for an improved EOR process involving nanostructures of a hydrophilic core-surfmer shell, which follows the viscosity increase and interfacial tension reduction mechanisms because of the release of high molecular weight hydrophilic polymers and surfactants in the oil-water interface. Consequently, the this technique not only acts as a protective layer for water soluble polymer from rapid degradations, but also targets delivery in another approach for an enhanced oil recovery process.

There is, therefore, a present need for such improved materials, compositions and manufactures to facilitate in extraction of oil, such as in secondary and tertiary extraction of oil and other materials.

These and many other objects are met in various embodiments of the present invention, offering significant advantages over the known prior art and consequent benefits in the extraction techniques.

SUMMARY OF THE INVENTION

The present invention is directed to an improvements in the design and preparation of a smart system for oil recovery and other uses. The compounds and structures pursuant to the methodologies of the present invention are preferably made of a core of a hydrophilic polymer nanoparticle, such as PAM, HPAM and TVP, and a hydrophilic-hydrophobic coating nanolayer (e.g., surfactant properties), such as a so-called PAM-b-PS copolymer made up of long hydrophilic and short hydrophobic blocks that are grafted or layered chemically or an inverse polymerized surfactant (surfmer), which are then used in smart core-shell nanostructure flooding during enhanced oil recovery processes. A surfmer function was directed toward the external phase instead of the internal phase. Consequently, the term inverse surfmer is proposed.

The smart system pursuant to the present invention is designed with two different approaches: 1) if the nanostructure of hydrophilic core-surfmer shell is considered, the polymer cores are preferably obtained via inverse emulsion polymerization using surfmer as the emulsifier, whereas the shell is obtained via polymerization using surfmer as the hydrophobic monomer of the shell. This demonstrates the application of a double function surfactant-monomer, and 2) if the nanostructure of hydrophilic core-block copolymer shell is considered, the polymer cores are obtained through inverse emulsion polymerization using some hydrophilic monomers, which are polymerized and terminated, whereas the shell is obtained via polymerization using other live radical chains, which are propagated without any termination agents.

Hydrophobic monomers are grafted with the hydrophilic open end chains to produce the monolayer of block copolymers. For example, PAM-b-PS, as a coating nanolayer with binary properties, is usually made by first polymerizing PAM, and then subsequently polymerizing styrene from the reactive end of the PAM chains. The average size of the pores in the porous media is about 1 micrometer, and the synthesized particles normally should be about one order of magnitude less than this size to permit adequate flow-through and prevent plugging. However, to obtain a stable suspension of particles in water, smaller particles may be required.

Therefore, the system, compounds and methodology of the present invention protect water soluble polymers from rapid degradations and mechanical shear stresses, both in surface facilities and near wellbores through porous media in underground reservoirs. Moreover, when the core-shell nanostructures of the present invention reach the oil-water interface during an enhanced oil recovery process, the external hydrophobic polymer block or nanolayers forming the block copolymer shell penetrates in the oil phase, protecting the interior hydrophilic polymer block with the ultrahigh molecular weight core polymer, which remains intact until reaching the aforesaid water phase, thereby thickening or increasing the viscosity of the water in the water phase, thereby pushing the oil to the production wells, as described hereinbelow.

However, the dissolution of the aforesaid hydrophilic polymer near the water-oil interface increases the local viscosity of the water between two surfaces considerably, rather than that of the whole surrounding area. The remaining polymer chains, with the binary properties between two phases, then plays the role of surfactants to increase the sweep efficiency of the oil recovery. Additionally, in the first prepared structure, after release of the hydrophilic chains into the water phase to increase viscosity, the surfmer, which has a surfactant tail in the water phase and a hydrophobic tail in oil phase, causes to thickening at the interface or frontier, reducing the interfacial tension between oil droplets and sand faces.

Accordingly, the nanostructures of the instant invention, having two mechanisms for use in EOR processes helps to greatly increase oil recovery. A smart system pursuant to the present invention includes a hydrophilic polymer-surfmer or hydrophilic polymer-block copolymer nanocomposites, not only acting as a protective layer for water soluble polymer from degradations, but also targeting delivery for another approach for an enhanced oil recovery process. The average pore size in underground reservoirs is about 1 micrometer, and the synthesized particles produced pursuant to the teachings of the present invention normally should be about one order of magnitude less than this size to prevent them from clogging or plugging, and obtain a stable suspension of the particles in water.

An investigation and characterization of the core-shell nanoparticle properties pursuant to the present invention are done by differential scanning calorimetry (DSC), Infra-red spectroscopy (IR), scanning electron microscopy (SEM), energy-dispersive X-ray spectroscopy (EDX), nuclear magnetic resonance spectroscopy (NMR), ultraviolet-visible spectroscopy (UV), X-ray photoelectron spectroscopy (XPS), auger electron spectroscopy (AES) and Ubbelohde viscometer.

It should be understood that the nanoscale coating of hydrophilic polymer nanoparticles in the manner described herein is successfully done, and that there is no effect of virgin monomers in the reaction environment. According to the surface infra-red test, peaks of the covered particles are similar to those of organic polymer particles. Also, the release behavior of the system, compound and methodology of the present invention is preferably investigated according to the realistic conditions of underground reservoirs using core flood and a laboratorial micromodel, including suitable grooves and porosities.

It should further be understood that the targeting release of active polymers and the thickening at the frontier of surfmer pursuant to the teachings of the present invention play considerable roles to increase EOR efficiency, and can reduce the amount of polymer used for obtaining the same recovery factor as compared with the traditional polymer flooding techniques.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying DRAWINGS, where like reference numerals designate like structural and other elements, in which:

DETAILED DESCRIPTION OF THE INVENTION

Figure 1:
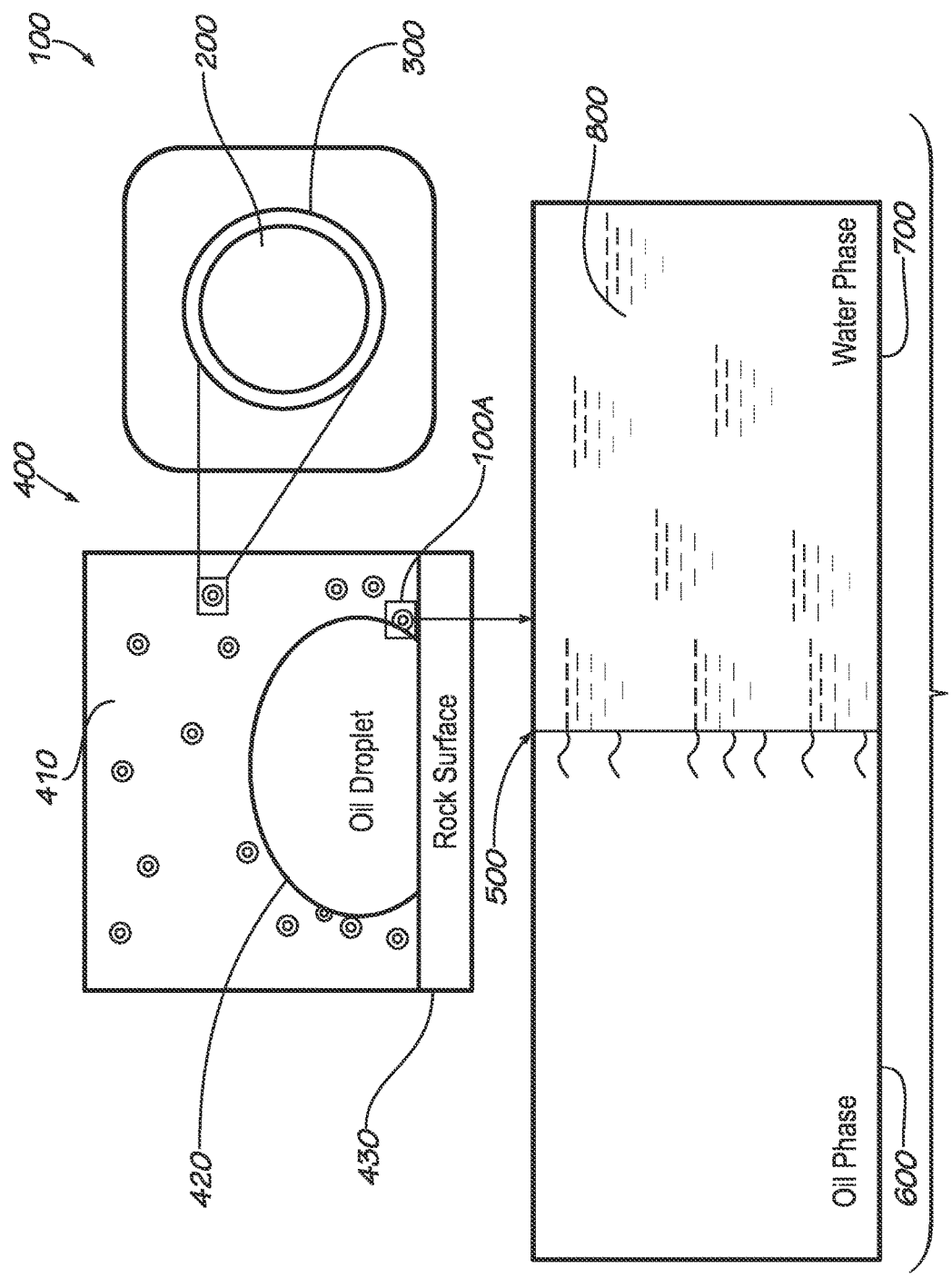
FIG. 1 generally shows penetration of external hydrophobic polymer blocks in the oil phase and remaining of hydrophilic polymer blocks and the core polymers in the water phase to make a thickened frontier with a high viscosity water phase to push oil to the production wells during a smart polymer flooding process pursuant to the teachings of the present invention.

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

In traditional polymer flooding, a high viscosity polymeric solution, including hydrophilic polymer and water, after water flooding and fingering phenomena, is injected into underground reservoirs by high viscosity pumps. This solution is injected to propagate through the water phase and control the mobility ratio of water to oil. Therefore, there are some main problems encountered in this technique, as set forth in more detail in the listing below.

First, these processes use huge and high viscosity pumps and other equipment to inject the viscous polymer solution into the underground reservoirs.

Second, the injection of high viscosity polymer solutions cause pressure drops in head wells.

Third, mechanical, thermal and bacterial damages, as well as surface absorption, results in the greatest disadvantages in the use of hydrophilic polymers, such as PAM, HPAM, TVP, and xanthan during the traditional polymer flooding.

Fourth, an increase in the water viscosity in undesired directions, e.g., before reaching the remaining oil areas, and use of excessive polymers to increase viscosity in heavy oil reservoirs are other limitations of this traditional polymer flooding technique and approach.

Fifth, there is the problem of trapping of long chains through low permeability sand plugs.

Sixth and finally, the chemicals to use in EOR process are expensive because of the requisite production procedure.

In smart polymer flooding, the low viscosity emulsions, including core-shell nanostructure and water, after water flooding and fingering phenomena, are injected into underground reservoirs by low viscosity pumps, such as water pumps, as is understood in the art. Before reaching the remaining oil areas being sought, the core-shell emulsions are not affected and progress toward the remaining oil areas. When the core-shell nanostructures reach the oil-water interface, such as during the aforesaid enhanced oil recovery process, two different scenarios can be followed:

1. Nanostructure of Hydrophilic Core-Block Copolymer Shell:

As discussed, the external hydrophobic polymer block from the block copolymer shell penetrates in the oil phase, and the hydrophilic polymer block and the ultrahigh molecular weight core polymer remain substantially intact to reach the water phase, thereby making a thickened frontier with a high viscosity water phase, and pushing the oil to the production wells. As noted, the dissolution of the hydrophilic polymer near the water-oil interface, considerably increases the local viscosity of the water between two surfaces, rather than that of the whole area, and the remaining polymer chains, with the binary properties between the two phases, play the role of surfactants to increase the sweep efficiency, as described.

In a preferred embodiment of the present invention, hydrophilic polymer nanoparticles are grafted or layered with a nanoscale layer of organic polymers. Basically, the nature of the core portion is that it has hydrophilic properties, and the surrounding nanolayer coating in this embodiment of the present invention preferably has two properties: hydrophilic (the closer coating areas near the core) and hydrophobic (the external part of shell further from the core) properties.

With reference now to FIG. 1 of the DRAWINGS, there is shown a preferred nanostructure of the present invention, generally designated by the reference numeral 100, which includes a polymeric core, generally designated by the reference numeral 200, and a surrounding coating, layer or shell, generally designated by the reference numeral 300. It should, of course be understood that the dimensions are in the nanoscale.

As also shown in FIG. 1, the nanostructures 100 of the present invention, such as in use in the recovery of oil, is injected or otherwise pumped into an area thought or known to have oil reserves or pockets therein, generally represented and designated by the reference numeral 400. As shown, some of the nanostructures are dispersed in the rock portions along with water, generally designated by the reference numeral 410, and some migrate to the area or areas containing oil, generally designated by the reference numeral 420, adjacent a rock surface 430.

With further reference to FIG. 1, there is illustrated activity of the aforesaid hydrophilic polymer chains for a particular nanostructure, generally designated by the reference numeral 100A, at the interface, generally designated by the reference numeral 500, between the oil pocket or surface, generally designated by the reference numeral 600, and the surrounding more watery portion, generally designated by the reference numeral 700. As shown in the oil phase portion 600 and the watery phase portion 700, a number of hydrophilic polymer chains, generally designated by the reference numeral 800, perfuse the watery portion 700 and extend into the oily surface 800 across the interface 500, as illustrated. As shown and as described further hereinbelow, the hydrophilic polymers bind in polymer chains to make a block copolymer with binary properties.

The operation of the aforementioned nanostructures pursuant to the instant invention during an EOR process involves a number of steps: contacting the covered nanoparticles 100 to the water-oil interface 500, where the hydrophobic head of chains 800 penetrate into the oil phase 600, and a hydrophilic tail of the nanostructures remain in the water phase 700, as shown. It should, therefore, be understood that the procedure of the present invention produces a wall of water 700 with high viscosity behind the oil phase 600, and causes the moving of the wall 700 to production wells for recovery. It should be understood that the process of binding the hydrophilic polymer chains 800 to a small organic polymer in the oil, generally designated by the reference numeral 850, is because the binding process prevents the separation of the organic part 850 in the oil phase 600. On the other hand, the binding of the nanostructures 100 by different properties, i.e., to the water portion 700 and the oil portion 600, causes an increase in water viscosity at the water-oil interface 500, which, as discussed, pushes the frontier in this area surface for recovery. This nanostructure 100 and the duality of connectivity is the greatest advantage of employing chemically grafted layering rather than conventional encapsulation.

In one embodiment of the present invention, a technique for producing hydrophilic polymer nanoparticles 100 with a thin binary layer is shown, including at first, an organic solvent (for example, hexane, toluene, xylene) and a surfactant (for example, span80, sodium dodecyl sulfate (SDS)) are mixed in a reactor. After total mixing of the organic phase, a hydrophilic monomer (for example, acrylamide) and water are injected into the previous solution. After mixing organic and hydrophilic materials to produce a homogenous emulsion, a hydrophilic initiator (for example, potassium persulfate-iron(II)sulfate.7H$_2$O redox system, and potassium persulfate) is injected into the reactor to start the core polymerization process under nitrogen purging, at a temperature between −15 to 90 centigrade.

It should be understood that the temperature range here depends on initiator and monomer selections. For example, temperatures of polymerization processes with potassium persulfate and a redox system are adjusted at about 60 and −15 centigrade, respectively. The polymerization time depends on the molecular weight and the dominated polymerization mechanism. If the acrylamide monomers become the candidate of producing active polymer, the mechanism is preferably radical polymerization. As is understood in the art, the radical mechanism is preferably done in 3 steps: initiation, propagation, and termination, where the propagation step is the most important step. On the other hand, the radicals of acrylamide, which is produced from the injecting initiator, has a short life, as in the first time use of the initiator injection; 60-70% of polymerization process is done, and just few of radicals remain survive, so that the controlling temperature and absence of oxygen increase their life span to increase the polymer chains.

It should also be understood that the termination of some chains in the reaction environment is inevitable, causing the production of the hydrophilic chains 800, such as in the water portion 700. At this time, by injection of a suitable organic monomer, such 5 as styrene, to the reaction environment, these monomers are bound to the growing hydrophilic polymer chains along surface of the particles 100, such as along the oil portion 600. The organic monomers move toward the surface of core polymer to make block copolymers because of the presence of the hydrophilic initiator on the surfaces of the hydrophilic polymer chains, along with strong mixing. As the final production step, the approach here is producing a structure, which is made of a hydrophilic polymer and a surrounding shell part made of an organic polymer. Thus, the rate of injecting organic monomers and the organic polymerization time are two considered parameters for producing a shell nanolayer pursuant to the principles of the present invention.

As the outer part of the shell 300 is dissolved in an organic solution, so the aforementioned solvent should be removed at the end of the reaction so as not to cause adhesion of the particles and any change in their size. The separation takes place with stirring and then centrifuging, with the stirring speed and time of the centrifugation process being important in the complete separation of organic solvents. After the centrifugation and separation of the synthesized particles, the goal is the producing the prepared particles 100 as powders. The stability of these particles 100, the time of their use, and the usage of a stable emulsion in the EOR process are important parameters in the process yield. Water must be removed from the suspension and particles in oil reservoirs can be used as powders, which is possible by the process of a freeze-drying method. Finally, the obtained powders have a core-shell nanostructure such that the nanoparticles 100 made of the hydrophilic polymer with high molecular weight, its shell 300 having two parts: an internal part made of the hydrophilic polymer, and an external part made of the organic polymer to make a block copolymer with the aforesaid binary properties.

Figure 2:
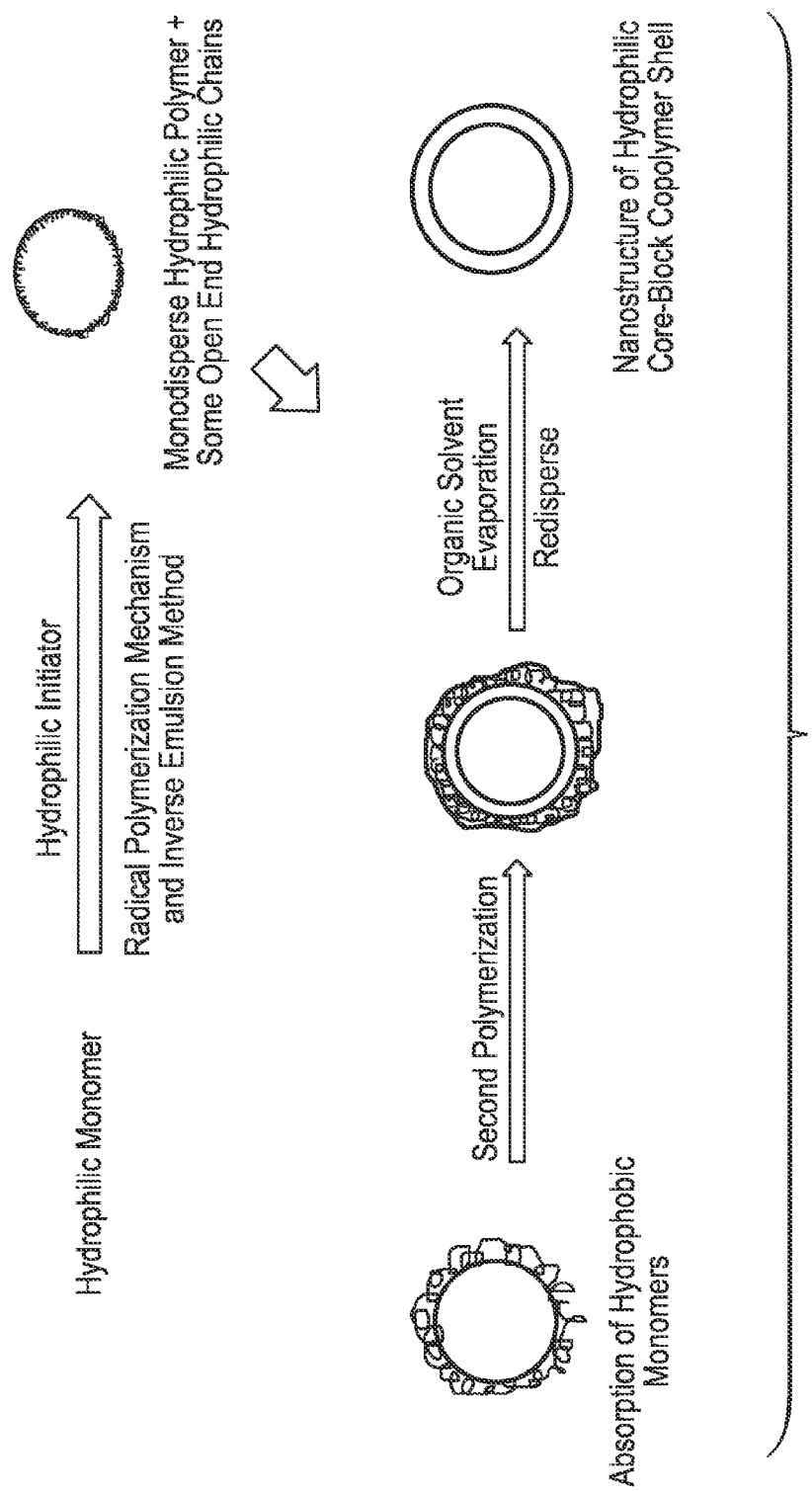
FIG. 2 shows a preferred procedure for the preparation of a nano structured core-block copolymer shell pursuant to the principles of the instant invention.

With reference now to FIG. 2 of the DRAWINGS, there is illustrated a schematic diagram of the preferred procedure for the preparation of the nanostructures 100 pursuant to the teachings of the present invention. As described hereinabove, the hydrophilic monomers are processed with a hydrophilic initiator, starting the polymerization process. In a second polymerization, the hydrophilic monomers are surrounded by organic monomers, resulting in the nanostructures 100, with the core-block 200 and the nanolayers 200 thereabout.

2. Nanostructure of Hydrophilic Core-Surfmer Shell:

In another embodiment of the present invention, there is shown a methodology for producing hydrophilic polymer core-surfmer shell nanoparticles, at first, the surfmer should be synthesized by binding a surfactant, such sodiumdodecylsulfate (SDS) and a hydrophobic monomer. This surfmer, which includes internal surfactant heads and external hydrophobic monomer tails, described in more detail hereinbelow, remains in the oil-water interface after reaching hydrophilic polymer core-surfmer shell nanoparticles in the interface.

Figure 3:
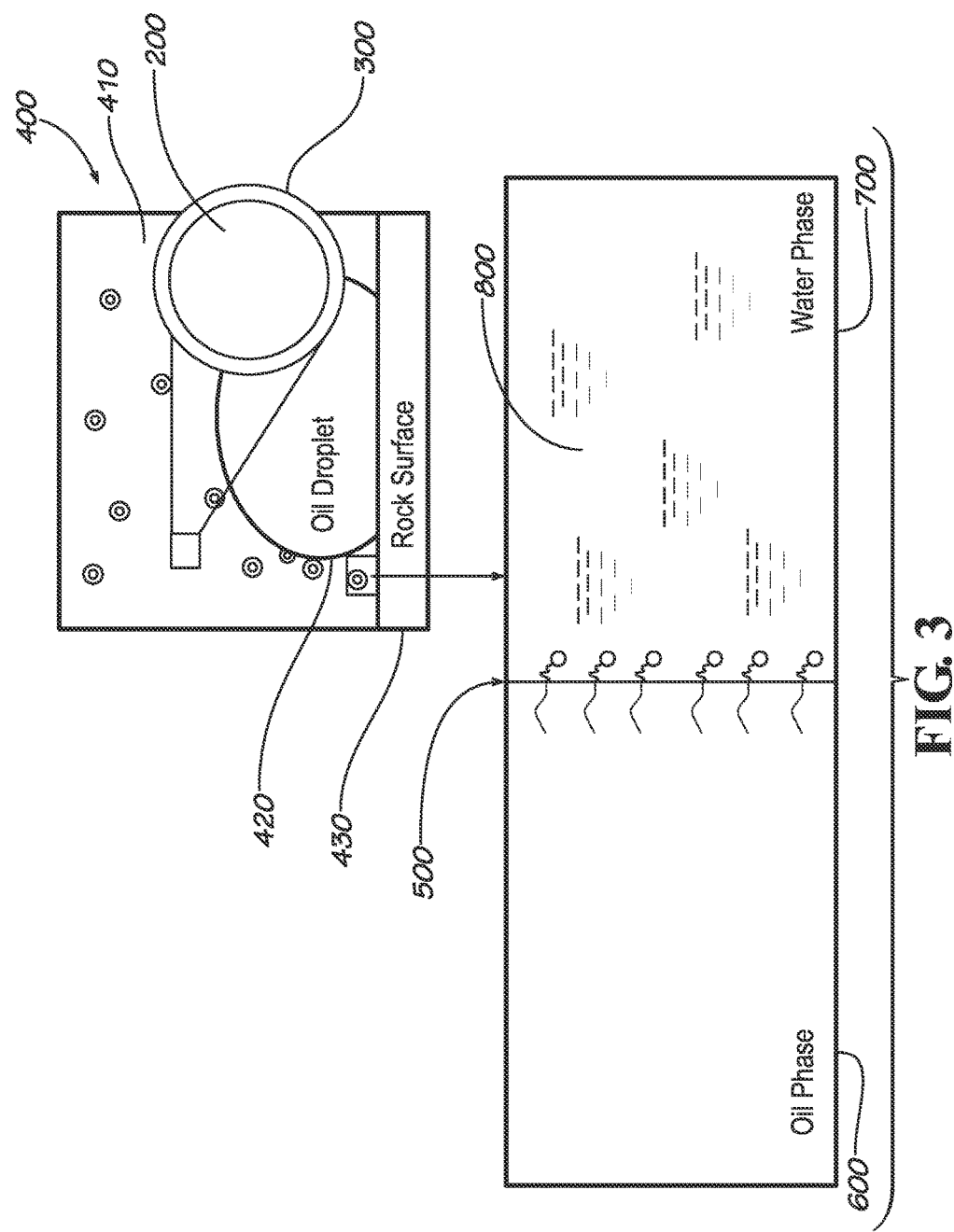
FIG. 3 shows penetration of external hydrophobic polymer tails and remaining of surfactant tails in the interface and the core polymer in the water phase to make a thickened frontier with high viscosity water phase to push oil to the production wells during the smart polymer flooding process pursuant to the teachings of the present invention.

With reference now to FIG. 3 of the DRAWINGS, there is also illustrated activity of the aforesaid hydrophilic polymer chains for a particular nanostructure 100A, along the interface 500, between the oil pocket or surface 600, and the surrounding more watery portion 700. As described, the surfmer remains at the interface 500, and then, the hydrophilic polymer core 200 is prepared by inverse emulsion polymerization under radical mechanism. An organic solvent (for example, hexane, toluene, and xylene) and the surfmer are mixed in a reactor. After total mixing of the organic phase, a hydrophilic monomer (for example, acrylamide) and water are injected into the previous solution.

After mixing the organic and hydrophilic materials to produce a homogenous emulsion, a hydrophilic initiator (for example, potassium persulfate-iron(II)sulfate.7H$_2$O redox system, and potassium persulfate) is injected into the reactor to start the core polymerization process under nitrogen purging, with a temperature between −15 to 90 centigrade. In a final step, the hydrophobic monomers, as external tails of surfmers, are polymerized with the addition of an initiator. Organic polymerization time is the considered parameter for producing a shell nanolayer pursuant to the instant invention. Using a stable emulsion for the EOR process, further treatments, such as separation and freeze-drying, are considered to have a core-shell nanostructure, such that its nanoparticles are made of the hydrophilic polymer with high molecular weight, the shell having an internal part made of the surfactant and an external part made of the organic polymer to make chains with binary properties.

Figure 4:
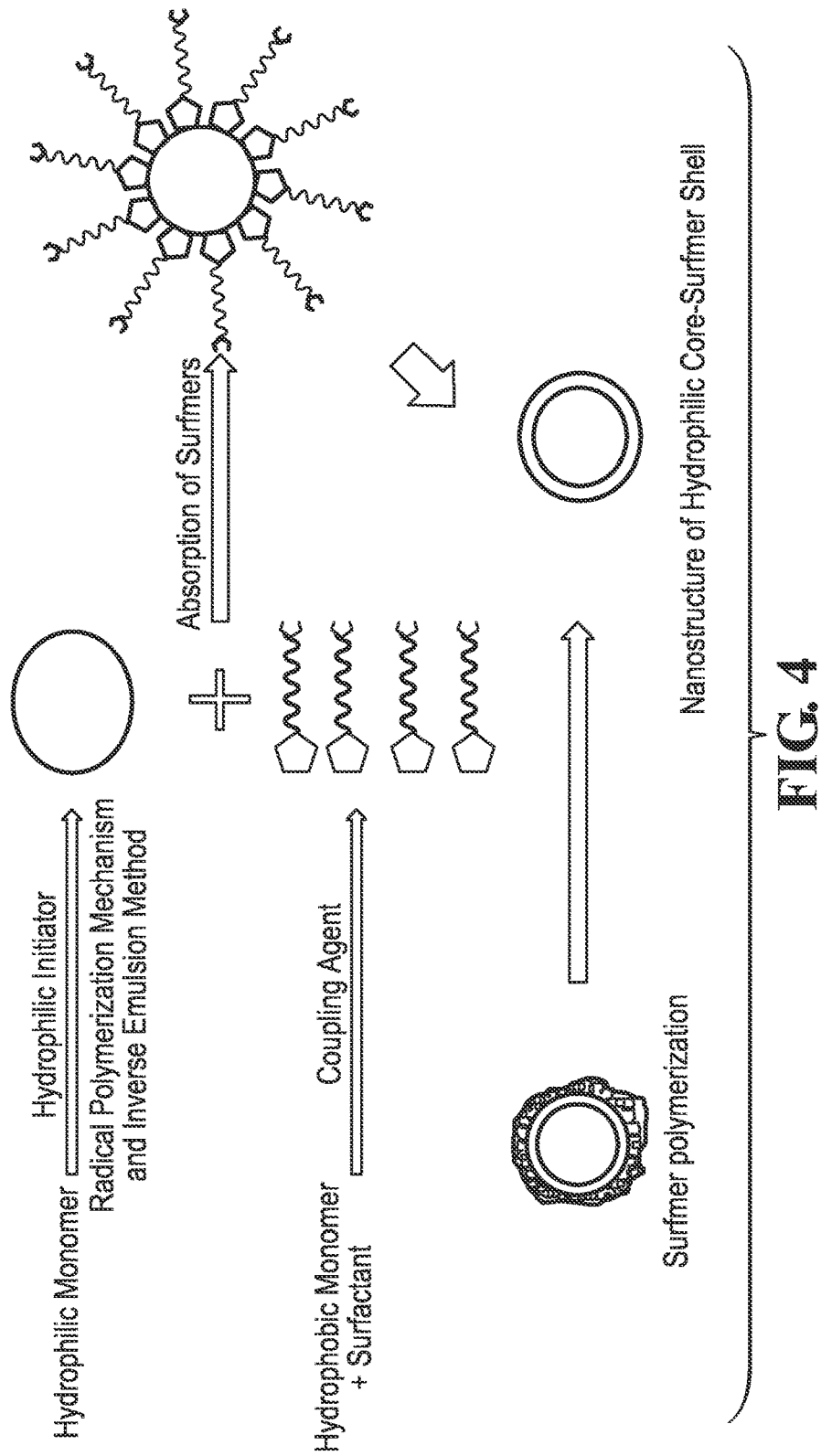
FIG. 4 shows a preferred procedure for the preparation of a nanostructured core-surfmer shell pursuant to the teachings of the present invention.

With reference now to FIG. 4 of the DRAWINGS, there is illustrated a schematic of the preferred procedure for the preparation of a polymer-surfmer nanocomposite pursuant to the teachings of the present invention.

It should be understood that the smart systems of the present invention with hydrophilic core-block copolymer shell nanostructures or hydrophilic core-surfmer shell nanostructures have at least three positive effects during smart polymer flooding over those of traditional polymer flooding, as discussed hereinbelow.

First, there is the protection of water soluble polymers from rapid degradations and mechanical shear stresses, both in surface facilities and near wellbores.

Second, there is targeted delivery of water soluble polymers to only the water-oil interface.

Third, there is a core-shell solution with low viscosity and density, before reaching to the remaining oil areas, that does not cause a pressure drop in the head wells and does not need high viscosity pumps to inject.

Fourth and finally, there is the potential for the simultaneous use of two effective mechanisms in EOR process, with viscosity increase and interfacial tension reduction.

It should be understood that there are different methods to identify material properties, and their presence in the obtained products. These methods include infra-red spectroscopy (IR), differential scanning calorimetery (DSC), nuclear magnetic resonance (NMR), X-ray photoelectron spectroscopy, and energy-dispersive X-ray spectroscopy (EDX) such that the results of the identification procedures show that coating of hydrophilic polymer nanoparticles by the organic polymeric nanolayer is successful.

After identification of the prepared materials, the effectiveness of the polymer structure during an EOR process are evaluated. The results of tests of the present invention show that due to the slow release of coated nanoparticles, the transferring of these particles to deeper parts of an oil reservoir is done successfully, and the release or outer layer dissolution is not done before the nanostructures 100 reach specified target points, and that the coating has a high capability for protecting the internal active polymer.

On the other hand, when using the coated hydrophilic polymer nanoparticles during smart polymer flooding, one can expect an efficiency increase during the process. Because the particles are in directed paths, this increases the viscosity of the water and results in interfacial tension reduction. According to results of smart polymer flooding process with the aforesaid core-shell nanostructure, using the core-shell structure reduces usage of the amount or quantity of the polymer for obtaining the same recovery factor as compared to traditional polymer flooding.

Set forth hereinbelow are TABLES 1, 2 and 3 illustrating the list of initiators, solvents, and surfactants; the properties of prepared nanoparticles; and the useable materials to use in this invention, respectively. A preferred procedure for the production of smart core-shell nanostructures to use in EOR process is as follows:

1. Nanostructure of Hydrophilic Core-Block Copolymer Shell:
   a. Strong mixing of an organic solvent and surfactant via a high speed homogenizer to produce a micelle system in the reactor b. Mixing of a hydrophilic monomer and water via a mechanical mixer to produce an aqueous solution
c. Injection of the aqueous solution (step b) into the reactor (step a) under nitrogen purging and extreme mixing
d. Injection of a hydrophilic initiator to start the core polymerization
e. Injection of hydrophobic monomers to attach the open end hydrophilic chains
f. At end of the reaction, removing the organic solvent and water from the resulted solution to make a fine powder with core-shell nanostructure 2. Nanostructure of Hydrophilic Core-Surfmer Shell:
a) Strong mixing of an organic solvent and a surfmer via a high speed homogenizer to produce a micelle system in the reactor
b) Mixing of a hydrophilic monomer and water via a mechanical mixer to produce an aqueous solution
c) Injection of the aqueous solution (step b) into the reactor (step a) under nitrogen purging and extreme mixing
d) Injection of a hydrophilic initiator to start the core polymerization
e) Injection of a hydrophobic initiator to start the surfmer polymerization
f) At end of the reaction, removing the organic solvent and water from the resulted solution to make a fine powder with core-shell nanostructure There are two points to produce and use the smart core-shell nanostructures 100, including hydrophilic core-block copolymer shell or hydrophilic core-surfmer during the smart polymer flooding.

First, one of the effective mechanisms in a chemical EOR process is application of surfactants to reduce interfacial tension and alter wettability. Accordingly, for hydrophilic core-surfmer nanostructures, the application of a surfmer is the best advantage to do this. On the other hand, for a hydrophilic core-block copolymer nanostructure, in a production procedure, there it is possible to use an appropriate surfactant with the polymer (for example, 20-60% of polymer weight) as physical mixing, that the simultaneous release of the surfactant and the polymer synergistically improves the flooding process. In this way, there are two positive effects: 1—use the core-shell nanostructure as polymer flooding, and 2—use the surfactant as surfactant flooding. However, emulsion polymerization leads to one of the greatest deficiencies of using excessive surfactant in other applications because of the presence of impurities.

Second, the useable materials for the core part are presented in TABLE 3. Two polymer classifications can be used for the core part: (1) general hydrophilic polymers, such as polyacrylamide, partially hydrolyzed polyacrylamide, hydrophobically modified polyacrylamide, and (2) sensitive hydrophilic polymers, such as thermoviscosifying polymers based on polyacrylamide main chain. In latter category are polymers made up a PAM main chain and some hydrophobic side chains whose viscosity increases upon increasing temperature and salinity.

TABLE (1)

List of initiators, solvents, and surfactants to use in this invention

| Initiator Group | Water soluble Initiator |
|---|---|
| Azo Initiator | 2,2'-Azobis[2-(2-imidazolin-2-yl)propane]dihydrochloride; 2,2'-Azobis[2-(2-imidazolin-2-yl)propane]disulfatedihydrate; 2,2'-Azobis(2-methylpropionamidine)dihydrochloride; 2,2'-Azobis[N-(2-carboxyethyl)-2-methylpropionamidine]hydrate; 2,2'-Azobis{2-[1-(2-hydroxyethyl)-2-imidazolin-2-yl]propane}dihydrochloride; 2,2'-Azobis[2-(2-imidazolin-2-yl)propane]; 2,2'-Azobis(1-imino-1-pyrrolidino-2-ethylpropane)dihydrochloride; 2,2'-Azobis{2-methyl-N-[1,1-bis(hydroxymethyl)-2hydroxyethl]propionamide}; 2,2'-Azobis[2-methyl-N-(2-hydroxyethyl)propionamide]; Azobisisobutyronitrile; 1,1'-Azobis(cyclohexanecarbonitrile) |
| Redox Initiator | Potassium persulfate- Iron (II) sulfate. 7H$_2$O; Potassium persulfate (PPS); Sodium metabisulfite (SMBS); Tetramethylethylenediamine (TEMED) |
| Thermal Initiator | Ammonium persulfate (AMPS) |
| Inorganic peroxides Initiator | Peroxydisulfate |

| Boiling Point Group | Organic Solvent |
|---|---|
| <50(° C.) | Diethyl ether; Methylene chloride; Pentane; Petroleum ether (ligroine) |
| 50-70(° C.) | Chloroform; Hexane; Methyl t-butyl ether (MTBE); Tetrahydrofuran (THF) |
| 70-100(° C.) | Benzene; 2-butanol; 2-butanone; Carbon tetrachloride; Cyclohexane, 1,2-dichloroethane; Ethyl acetate; Heptane; N-methyl-2-pyrrolidinone(NMP); Triethyl amine |
| 100-130(° C.) | 1-butanol; Nitromethane; Pyridine, Toluene |
| >130(° C.) | Chlorobenzene; Diethylene glycol; Dimethyl sulfoxide (DMSO), xylene |

| Surfactant Types | Surfactant |
|---|---|
| Anionic | Carboxylates; Sulphonates; Petroleum Sulphonates; Alkylbenzenesulphonates, Naphthalenesulphonates; Olefin Sulphonates; Alkyl Sulphates; Sulphates; Sulphated Natural Oils & Fats; Sulphated Esters; SulphatedAlkanolamides; Alkylphenols; Ethoxylated&Sulphated |
| Cationic | Quaternary Ammonium Salts; Amines With Amide Linkages; Polyoxyethylene; Alkyl & Alicyclic Amines; N,N,N',N' Tetrakis Substituted Ethylenediamines; 2-Alkyl 1-Hydroxethyl 2-Imidazolines |

TABLE (1)-continued

List of initiators, solvents, and surfactants to use in this invention

| | |
|---|---|
| Non-Ionic | Ethoxylated Aliphatic Alcohol; Polyoxyethylene Surfactants; Carboxylic Esters; Polyethylene Glycol Esters; Anhydrosorbitol Ester & It's Ethoxylated Derivatives; Glycol Esters of Fatty Acids; Carboxylic Amides; Monoalkanolamine Condensates; Polyoxyethylene Fatty Acid Amides |
| Amphoteric | N-Coco 3-Aminopropionic Acid/Sodium Salt, N-Tallow 3-Iminodipropionate, Disodium Salt, N-Carboxymethyl N Dimethyl N-9Octadecenyl Ammonium Hydroxide, N-Cocoamidethyl N Hydroxyethylglycine, Sodium Salt |

TABLE (2)

Core-shell nanostructure specifications in this invention

| Properties | Range |
|---|---|
| Molecular Weight of Polymeric Core (Daltons) | >5,000,000 |
| Molecular Weight of Polymeric Layer (Daltons) | 20,000-30,000 |
| Core Size (nm) | <100 |
| Coating Size (nm) | <20 |
| Release Time (day) | >30 |
| Viscosity (Pa · S) @ shear rate = 0.01 (1/s) | ~6 |
| Viscosity (Pa · S) @ shear rate = 100 (1/s) | ~0.02 |
| Shear (Pa) @ shear rate = 0.01 (1/s) | ~0.05 |
| Shear (Pa) @ shear rate = 100 (1/s) | ~6 |
| Specific Viscosity (Pa · S) @ Angular Frequency = 0.1 (1/s) | ~10 |
| Specific Viscosity (Pa · S) @ Angular Frequency = 100 (1/s) | ~0.3 |
| Storage Module, G' (Pa) @ Angular Frequency = 0.1 (1/s) | ~0.4 |
| Storage Module, G' (Pa) @ Angular Frequency = 100 (1/s) | ~500 |
| Loss Module, G" (Pa) @ Angular Frequency = 0.1 (1/s) | ~0.5 |
| Loss Module, G" (Pa) @ Angular Frequency = 100 (1/s) | ~100 |

TABLE (3)

Useable materials for core and shell parts

| Group | |
|---|---|
| | Hydrophilic Polymers as Core Part |
| Poly(N-isopropylacrylamide) (PNIPAM) and Polyacrylamide (PAM) | Poly(N-isopropylacrylamide) (PNIPAM) and Copolymers Polyacrylamide (PAM) and Copolymers Hydrolyzed polyacrylamide (HPAM) |
| Poly(2-oxazoline) and Polyethylenimine (PEI) | Poly(2-oxazoline) Polyethylenimine (PEI) |
| Poly(acrylic acid), Polymethacrylate and Other Acrylic Polymers | Poly(acrylic acid) (PAA) and Copolymers Poly(methacrylic acid)s and Polymethacrylates Other Acrylic Polymers |
| Poly(ethylene glycol) and Poly(ethylene oxide) | Poly(ethylene glycol) (PEG) and Copolymers Poly(ethylene oxide) |
| Poly(vinyl alcohol) (PVA) | Poly(vinyl alcohol) (PVA) and Copolymers |
| Poly(vinylpyrrolidone) (PVP) | Poly(vinylpyrrolidone) (PVP) and Copolymers |
| Polyelectrolytes | Poly(styrenesulfonate) (PSS) and Copolymers Polyacrylamide (PAM)-based Polyelectrolytes Poly(acrylic acid) (PAA), Sodium Salt Poly(allylamine hydrochloride) Poly(diallyldimethylammonium chloride) Solution Poly(vinyl acid) |
| Cucurbit[n]uril Hydrate | n = 5, 6, 7, 8 |
| Miscellaneous Hydrophilic Polymers | Maleic Anhydride Copolymers Polyethers |
| | Hydrophobic Polymers as Shell Part |
| Acrylics | Acrylate Polymers Acrylonitrile Polymers and Copolymers Maleic Anhydride Copolymers Methacrylate Polymers |
| Amides and Imides | Amides and Imides |
| Carbonates | Carbonates |
| Dienes | Dienes |
| Esters | Esters |
| Ethers | Ethers |
| Fluorocarbons | Fluorocarbons |
| Olefins | Butene and Higher Ethylene, Propylene |
| Styrenes | Polystyrene Styrene copolymers Substituted and Modified Styrenes |
| Vinyl Acetals | Vinyl Acetals |
| Vinyl and Vinylidene Chlorides | Vinyl and Vinylidene Chlorides |

TABLE (3)-continued

Useable materials for core and shell parts

| Group | |
|---|---|
| Vinyl Esters | Vinyl Esters |
| Vinyl Ethers and Ketones | Vinyl Ethers and Ketones |
| Vinylpyridine and Vinypyrrolidone Polymers | Poly(vinylpyridine) |
| | Poly(vinylpyrrolidone) |
| | Surfmer (Hydrophobic monomer-Surfactant) |

Chemically binding all hydrophobic monomers and surfactants to produce surfmers including internal surfactant heads (stabilizer of hydrophilic core polymerization) and external hydrophobic monomers (hydrophobic coating nanolayer)

Example 1: Nanostructure of Hydrophilic Core-Block Copolymer Shell (PAM/PAM-c-PS)

In this exemplary embodiment of the present invention, a first, 60 ml of hexane solvent and 0.0035 ml of a surfactant sorbitane monooleate (span 80) in a reactor are mixed by a mechanical mixer at a speed of about 2000 rpm. Then, an aqueous solution, including 5 g acrylamide and 20 ml water, is added to the previous solution under mixing and nitrogen purging by the microinjection method that produce emulsion of nanoparticles in the organic phase. After the completion of a water phase emulsion in organic thinner, the redox initiator system, including ferrous sulfate and potassium per sulfate, is added to the emulsion system with amounts 0.001688 and 0.0007225 g, respectively, at a temperature of about −15° C. With the injection of the initiator, the core polymerization process starts and the required time for completion of this process is about 30 minutes. At that time 0.2 ml styrene monomers are added to the reaction environment to prevent from termination of all chains. The chains which reached to the termination step make the core polymer, and surviving long chains, with the addition of no hydrophilic polymer, make block copolymers that include internal hydrophilic and external hydrophobic parts, as described in more detail hereinabove.

By controlling the amount of organic monomers and reaction conditions, the thickness of the coating layer is controlled. According to the aforementioned properties, for having less molecular weight and thickness of organic coating as its advantages, the chain transfer should be considered in special time (e.g., shell polymerization time: 10 min) to prevent from high propagation of the polymer chains. Accordingly, using a short time for the second inverse emulsion polymerization, a layer of polystyrene (PS) is produced on polyacrylamide nanoparticles. Since polystyrene layer is soluble in hexane solvent, it should be removed from the reactor, which prevents from tenacity of particles and changing of the size distribution. This removal is done as follows: materials of the reactor are removed from the reaction environment and centrifuged at 5500 rpm speed for 30 minutes.

After this process, these materials are preferably divided to 3 phases. The bottom phase is made of high pure hexane with dark color; the centric phase is made of covered solid with white color; and the upside phase is made of hexane and covered particles mixture. The centric phase, which is made of covered nanoparticles, is shed into water and remains under mixing conditions for 3 minutes; then, sprayed with high pressure into water by an anti-solvent precipitation method. After centrifuging and removal of the synthesized particles from the other particles, the goal is producing powders. Accordingly, water is removed from the suspension system, and the dried powders are used in oil reservoirs, which is preferably performed by freeze-drying. Finally, the resultant powders have a core-shell nanostructure of polyacrylamide with about 6 million Daltons molecular weight and diameter about 50 nm as the core part, and a styrene nanolayer with binary properties that has a thickness of about 25 nm as the protection and targeting part.

For investigation of the release behavior of polyacrylamide, the test is designed that covered nanoparticles remain in xylene-water mixture for a specified time. In this time, in specified yields, measurement of viscosity of the water phase is done using a Ubbelohde viscometer. Under these conditions, with contact of constructed nanoparticles to the organic phase under temperature near the temperature of the underground reservoir (90° C.), the long chain polyacrylamide and styrene tails penetrate into the water and oil media, respectively. This causes the release of polyacrylamide and the increase of thickener concentration and water viscosity, as described hereinbefore.

Additionally, the realistic conditions of releasing covered polymers in the oil phase are investigated using laboratorial micromodel with suitable holes and grooves, according to real conditions of an underground reservoir. The delayed release and blocking of swept paths by active polymers have important roles to increase EOR efficiency, and the use of polymers decrease considerably as compared to that of traditional polymer flooding processes. Employing the mechanism in this test, the oil recovery factor using smart polymer flooding can be describe like this: the polymer is used in a sufficient amount for advanced deploy, and the recovery percent is the same as with traditional polymer flooding process (~14%). On the other hand, in flooding processes employing the new nano structures 100, just 30% of the polymer is consumed to control mobility ratio and enhance oil recovery.

Example 2: Nanostructure of Hydrophilic Core-Block Copolymer Shell (TVP/PAM-c-PS)

A thermoviscosifying water soluble polymer (TVP) with the molecular weight of 5 million Daltons was synthesized by radical copolymerization of acrylamide with a newly-developed thermo sensitive monomer, MPAD. At this time 0.4 ml styrene monomers were added to the reaction environment. The chains which reached to the termination step make the core polymer, and surviving long chains make block copolymers that include internal hydrophilic and external hydrophobic parts. The chain transfer should be considered in a special time (e.g., shell polymerization time: 15 min) to prevent high propagation of the polymer chains. The polystyrene layer is soluble in hexane solvent, and should be removed from the reactor, which prevents the tenacity of the particles and changing of the size distribution. This removal is preferably done via a low speed rotary as a solvent evaporator. Then, the remaining materials are sprayed with high pressure into water by an anti-solvent precipitation method and dried by a freeze-drying process. Finally, the powders have a core-shell nanostructure of a thermoviscosifying polymer based on polyacrylamide main chain with 5 million Daltons molecular weight and a diameter of 60 nm as the core part, and a styrene nanolayer with binary properties having a thickness of 40 nm as the protection and targeting part.

A 0.5 wt % polymer aqueous solutions was prepared by dissolution of the aforesaid polymer powders in synthetic brine with total dissolved solids (TDS) of 30,000 mg/L, including $Ca^{2+}$ and $Mg^{2+}$. The polymers were dissolved with stirring to complete the hydration, and then left for 1 day. The smart polymer flooding was performed under the simulated high temperature and salinity of oil reservoirs. A steel cylinder about 4 cm in diameter inside and about 40 cm in height was packed with several sizes of silica based sands in model. The sand package was initially saturated with the synthetic brine, followed by injecting the dehydrated oil. The core was injected with the synthetic brine until the water content was higher than 90% in the output fluid, and the injection of 40% pore volume (PV) of 0.5% TVP-PS solution was followed. The total oil recovery and the oil recovery by water flooding were calculated, respectively, and the difference between them was the tertiary oil recovery factor by smart polymer flooding. The injection rate of polymer solution was controlled at 0.1 mL/min, and the cylindrical sand package was heated at 100° C. by placing in a chamber.

According to results of the recovery factor, it was found that 23.5% oil recovery factor by TVP-PS flooding was obtained at such harsh conditions. The main reasons to get a relatively high oil recovery factor with the TVP polymer in core-shell nanostructure can be attributed to at least two points.

First, the unique, steady and dynamic rheological properties of TVP polymer at high temperatures and salinities; the apparent viscosity and elastic modulus of the TVP aqueous solution increase with increased temperature. Under simulated high temperature and salinity oil reservoir conditions, the apparent viscosity and G' of TVP can increase to ~100 mPa·s and 200 mPa, respectively, thus effectively improving the mobility ratio of water to oil to make more oil produced.

Second, the core-shell nanostructures, including a TVP polymer nanoparticle as a core material, and a block copolymers with the internal long PAM chain and external short PS hydrophobic block as a coating nanolayer, have three positive effects during smart polymer flooding: protection of water soluble polymers from mechanical and biological degradations, targeting delivery of water soluble polymers to only the water-oil interface, and salinity and temperature resistance of the polymer core.

Example 3: Nanostructure of Hydrophilic Core-Surfmer Shell (PAM/Surfactant-PS)

Polymerized surfactants, including dodecylsulfate (SDS) as an internal part and styrene monomer as an external part are synthesized as follows. An aqueous solution of SDS corresponding to 1:1 molar ratio with respect to styrene is mixed with the salt of styrene based. The interchange of ions produces the precipitation of the sulfate salt of styrene because of the much lower solubility of this salt in water at room temperature. Salt purification was performed by saturation of an aqueous solution at temperature 50° C. Then the solution is cooled under normal conditions. After refrigeration of the supernatant at 4° C. for 5 hours, the solid is recovered by filtration on a filter paper and dried under vacuum at 40° C.

For producing core nanoparticles, 30 ml of Toluene and 0.043 g of the synthesized surfmer are mixed strongly via a high speed homogenizer to produce a stable micelle system in the reactor. Then, an acrylamide monomer aqueous solution, including 20 wt %, is added to the previous solution under mixing and nitrogen purging by the microinjection method that produce emulsion of nanoparticles in the organic phase. After the preparation of the emulsion, 0.003200 g of potassium persulfate is added to the emulsion system in temperature about −60° C. With the injection of the initiator, the core polymerization process starts and the required time for completion of this process is about 15 minutes. Then, 0.001 g dicumyl peroxide and 0.3 ml styrene monomer are added to start surfmer polymerization and make organic nanolayer. The separation process and purification of the resulted materials are done via a low speed rotary as a solvent evaporator. Then, the remaining materials are sprayed with high pressure into water by an anti-solvent precipitation method and dried by a freeze-drying process.

Finally, the powders have a core-shell nano structure of polyacrylamide with 6.4 million Daltons molecular weight and diameter 40 nm as the core part, and a styrene nanolayer with binary properties that has thickness 20 nm as the protection and targeting part.

Polymer aqueous solutions at 1 wt % were prepared by dissolution of polymer powders in a synthetic brine with total dissolved solids (TDS) of 30,000 mg/L, including $Ca^{2+}$ and $Mg^{2+}$. Smart polymer flooding was performed under the simulated high temperature and salinity oil reservoirs. The injection of 30% pore volume (PV) of 1% PAM/surfactant-PS solution was followed. The injection rate of polymer solution was controlled at 0.1 mL/min, and the cylindrical sand package was heated at 100° C. by placing in a chamber.

According to results of the recovery factor, it was found that 21.0% oil recovery factor by PAM/surfactant-PS flooding was obtained at such harsh conditions. Getting a relatively high oil recovery factor with PAM/surfactant-PS core-shell nanostructure can be attributed to applying surfmer in an important role during EOR processes. After the core-shell nanostructure reaches the oil-water interface, this structure is divided to different parts; part (1), originating from a polymer core, propagates throughout water phase to increase viscosity as traditional polymer flooding, and part (2) is trapped in the interface to make a thickened frontier, as described hereinabove. However, the core-shell nanostructure can protect and target deliver active materials before reaching the interface.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the breadth or scope of the applicant's concept. Furthermore, although the present invention has been described in connection with a number of exemplary embodiments and implementations, the present invention is not so limited but rather covers various modifications and equivalent arrangements, which fall within the purview of the appended claims.

What is claimed is:

1. A smart polymeric core-shell nanostructure comprising:
   a core including a hydrophilic polymer nanoparticle, including hydrophilic polymeric chains with high molecular weight, the high molecular weight being weights between 5 million Dalton and 6.4 million Dalton; and
   a coating shell around and chemically grafted to the hydrophilic polymeric chains, wherein:
   the coating shell includes a hydrophilic portion and a hydrophobic portion.

2. The smart polymeric core-shell nanostructure according to claim 1, wherein the hydrophilic polymer nanoparticle including the hydrophilic polymeric chains with the high molecular weight between 5 million Dalton and 6.4 million Dalton is structured to increase the viscosity of a water phase through an oil recovery process.

3. The smart polymeric core-shell nanostructure according to claim 2, wherein the hydrophilic polymeric chains with high molecular weight include acrylamide-based polymers.

4. The smart polymeric core-shell nanostructure according to claim 1, wherein the hydrophilic portion of the coating shell covers directly upon the hydrophilic polymer nanoparticle and is chemically grafted to the hydrophilic polymer nanoparticle.

5. The smart polymeric core-shell according to claim 1, wherein the hydrophobic portion of the coating shell is atop at least one hydrophilic layer over the hydrophilic polymer nanoparticle.

6. The smart polymeric core-shell nanostructure according to claim 1, wherein:
   the hydrophobic portion of the coating shell includes hydrophobic tails,
   the hydrophilic polymeric chains are structured to penetrate into a water phase and the hydrophobic tails are structured to penetrate into an oil phase through an oil recovery process after a pre-defined time, and to release the hydrophilic polymer nanoparticle in the water phase.

7. The smart polymeric core-shell nanostructure according to claim 6, wherein the pre-defined time is defined through a synthesis process of the smart polymeric core-shell nanostructure.

8. The smart polymeric core-shell nanostructure according to claim 6, wherein the hydrophilic polymer nanoparticle released in the water phase increases the viscosity of the water phase through an oil recovery process.

9. The smart polymeric core-shell nanostructure according to claim 6, wherein the coating shell is structured to diffuse bilaterally in an interface between the oil phase and the water phase, in a manner that increases a local viscosity of the interface and then releases the hydrophilic polymer nanoparticle in the water phase through an oil recovery process.

10. The smart polymeric core-shell nanostructure according to claim 9, wherein the interface between the oil phase and the water phase includes an oil-water interface or a water-oil interface.

11. The smart polymeric core-shell nanostructure according to claim 8, wherein an aqueous solution of the smart polymeric core-shell nanostructure increases the viscosity of water, whereby oil contacted with the smart polymeric core-shell nanostructure is pushed to production wells through the oil recovery process.

12. The smart polymeric core-shell nanostructure according to claim 2, wherein the hydrophilic polymer nanoparticle includes polyacrylamide.

13. The smart polymeric core-shell nanostructure according to claim 1, wherein the coating shell includes a plurality of surfmers.

14. The smart polymeric core-shell nanostructure according to claim 1, wherein the surfactant includes sodiumdodecylsulfate (SDS).

15. The smart polymeric core-shell nanostructure according to claim 14, wherein the hydrophobic monomer includes styrene.

16. A smart polymeric core-shell nanostructure comprising:
   a core including a hydrophilic polymer nanoparticle, and
   a coating shell around the hydrophilic polymer nanoparticle, wherein the coating shell includes a layer with hydrophilic-hydrophobic binary properties, and wherein:
   the coating shell includes a plurality of surfmers,
   the plurality of surfmers is synthesized by binding a surfactant and a hydrophobic monomer, and
   the surfactant includes sodiumdodecylsulfate (SDS).

17. The smart polymeric core-shell nanostructure according to claim 1, wherein the coating shell includes a plurality of block copolymers, and wherein
   the plurality of block copolymers include a copolymer of a hydrophilic polymer and a hydrophobic polymer.

18. The smart polymeric core-shell nanostructure according to claim 1, wherein the coating shell includes:
   a plurality of hydrophilic chains, the plurality of hydrophilic chains being chemically grafted to the hydrophilic polymeric chains of the core; and
   a plurality of hydrophobic tails, the plurality of hydrophobic tails forming the outer layer of the coating shell.

19. The smart polymeric core-shell nanostructure according to claim 1, wherein the coating shell includes:
   a hydrophobic portion and a hydrophilic portion, and
   the hydrophobic portion forms an external portion of the coating shell, farther from the core than the hydrophilic portion.

* * * * *